United States Patent [19]

Hirayama

[11] Patent Number: 5,409,033
[45] Date of Patent: Apr. 25, 1995

[54] OVERFLOW-PREVENTING VALVE

[75] Inventor: Yasutoshi Hirayama, Hiroshima, Japan

[73] Assignee: MHI Turbo-Techno Co., Tokyo, Japan

[21] Appl. No.: 84,177

[22] Filed: Jul. 1, 1993

[30] Foreign Application Priority Data

Jul. 8, 1992 [JP] Japan .................. 4-053783 U

[51] Int. Cl.$^6$ ................. F16K 31/22; F16K 33/00
[52] U.S. Cl. ........................... 137/202; 137/433
[58] Field of Search ............. 137/192, 202, 430, 433; 73/305, 309, 322.5

[56] References Cited

U.S. PATENT DOCUMENTS

| | | | |
|---|---|---|---|
| 442,529 | 12/1890 | Merrill | 137/433 |
| 1,073,354 | 9/1913 | Lauterbach | 137/433 |
| 1,139,130 | 5/1915 | McKeown | 137/202 |
| 1,667,877 | 5/1928 | Star | 137/433 |
| 2,812,772 | 11/1957 | Moore | 137/202 |
| 3,467,135 | 9/1969 | Muskalla | 137/433 |
| 3,768,505 | 10/1973 | Benke | 137/433 |
| 3,860,026 | 1/1975 | Van Der Koogh | 137/202 |
| 3,910,1302 | 10/1975 | Sudhir | 137/202 |

*Primary Examiner*—George L. Walton
*Attorney, Agent, or Firm*—Kanesaka & Takeuchi

[57] ABSTRACT

An overflow-preventing valve of the present invention is installed in a sealing liquid supply system for a compressor. The overflow-preventing valve includes first and second valve bodies with inlet and outlet portions, a chamber formed in at least one of the valve bodies, and a float valve situated in the chamber. The float valve has an inverse U-character shape in a cross section and is slidably mounted in the chamber so that when a liquid level rises, the float valve comes into close contact with an upper portion of the chamber to prevent the liquid from entering into the outlet portion. The sealing liquid supply system includes a sealing liquid pump, a sealing liquid head tank, a liquid level controller and a liquid level controlling valve, in addition to the overflow-preventing valve. In the system, the sealing liquid is almost completely prevented from passing through the overflow-preventing valve without transfer barriers.

4 Claims, 3 Drawing Sheets

5,409,033

1

OVERFLOW-PREVENTING VALVE

BACKGROUND OF THE INVENTION AND RELATED ART STATEMENT

This invention relates to an overflow-preventing valve and the application thereof. More specifically, the present invention relates to an overflow-preventing valve that effectively works for preventing a sealing oil or a lubricating oil from overflowing out of a system for a rotary machine which is used in an inorganic or organic chemical plant, a petroleum refinery plant, a plant for manufacturing chemicals and a power plant, and to the application thereof.

A conventional sealing oil supply system for a centrifugal compressor has a structure, for example, as shown in FIG. 5. In FIG. 5, a sealing oil for preventing gas from leaking out of a compressor is pressurized by a sealing oil pump 1 and is adjusted to a constant predetermined differential pressure (a difference between an oil pressure and a gas pressure) through a liquid level control valve 2 and a liquid level controller 4 to correspond to an internal pressure of a compressor 8. The sealing oil is fed to the compressor 8 through a sealing oil supply pipe 3. To control the pressure, a gas pressure transmitting pipe 6 is connected from the compressor 8 to an upper portion of a sealing oil head tank 5. Any change such as an increase or a decrease in the gas pressure in the compressor 8 is detected by the liquid level controller 4, and an air pressure signal is sent to the liquid level control valve 2 to regulate the valve in order to control a supply rate of oil, so that the predetermined differential pressure between the gas pressure in the compressor 8 and the pressure of the sealing oil is constantly maintained, thereby to prevent the gas from leaking out of a casing.

A plurality of transfer barriers 9 equipped with rubber bladders therein is provided between the sealing oil supply pipe 3 and the sealing oil head tank 5, so that the sealing oil to be fed and the oil in the sealing oil head tank 5 are kept separated from each other by the rubber bladders in the transfer barriers 9 even in the event that the pressure for supplying the sealing oil is abnormally raised due to a trouble and/or an inappropriate operation of the liquid level control valve 2 or the liquid level controller 4. Thus, the oil in the sealing oil head tank 5 is prevented from flowing into the compressor 8 through the gas pressure transmitting pipe 6. In the conventional system shown in FIG. 5, the transfer barriers 9 are usually so small that a plurality of barriers has to be provided in order to create a capacity comparable to an amount of oil in the sealing oil head tank 5.

Moreover, the sealing oil in the sealing oil head tank 5 is isolated by the sealing oil transfer barriers 9, wherein a considerable period of time is required for charging the oil to be stored in the tank beforehand, and somewhat sophisticated skill is also required for adjusting the level of the oil in the tank. Furthermore, the rubber bladders in the transfer barriers 9 are always in contact with oil and are shrunk during operation of the compressor 8 or the rubber bladders may be aged in a long usage. Thus, the bladders are hardened or broken and become defective. Therefore, in order to prevent such an accident, the transfer barriers must be regularly renewed, to cause a great burden in an maintenance cost.

Therefore, the transfer barriers 9 may be omitted to save the cost of facilities. Even though a sealing oil

2 overflow rarely occurs, in such a case, the compressor must be disassembled and re-assembled in order to clean the overflowed sealing oil, which requires laborious work and a large amount of time. For example, in case of disassembling and re-assembling a centrifugal compressor in an ethylene producing plant, a total time was two to five days inclusive of purging with gas and re-starting (e.g. 5 men × 12 hours × 2 shifts × 2 days), which also caused a production loss of several hundred million yen.

The present inventor, therefore, had studied various overflow-preventing valves but could not find any desirable valves.

For instance, (1) Japanese Patent Application Laid-Open Publication (Kokai) No. 93625/1988 discloses a device for preventing fuel from flowing out, and (2) Japanese Patent Application Laid-Open Publication (Kokai) No. 240468/1990 discloses an exhaust valve. In the case of the Publication (1), however, the device is designed to cope with a case where a fuel tank is turned sideways by about 90 degrees, so that a valve moves and comes into intimate contact with a valve seat due to the self-weight of the fuel and closes a flow path to thereby permit some fuel (oil) to flow out. Also, the valve of the Publication (1) is not quite utilizable as a stationary overflow-preventing valve that does not incline. In the case of the valve disclosed in the Publication (2) (see FIG. 3 which is a sectional view of the prior art), an orifice 21A is provided on an outlet side to separate and discharge only gas since it is not possible for the conventional discharge valve to completely prevent drain of liquid. In case a gas pressure suddenly changes in the system, however, there is another problem that the orifice 21A itself functions as a resistance, causing delay of transmission of pressure. When the above valve is used for a sealing oil supply system of FIG. 4, it is, therefore, difficult to finely adjust a liquid level.

The present inventor therefore has conducted a study, and has discovered a fact that the above-mentioned problems can be solved if a float valve 13 could be made in a shape of an inverse U-shaped cross section instead of the conventional closed spherical body 13G (see FIG. 3), and has arrived at the present invention.

OBJECTS AND SUMMARY OF THE INVENTION

An object of this invention is to provide an overflow-preventing valve which is capable of almost completely preventing liquid from overflowing even when a liquid level rises quickly or slowly.

Another object of this invention is to provide an overflow-preventing valve which has a simple structure such that a valve chamber is easily constructed to have a high corrosion resistance, so that the valve can be used for a variety of gasses and liquids. Moreover, a float valve has a small size and an outlet diameter of the valve is made large to allow the valve to respond quickly to a change in liquid level.

A further object of this invention is to provide a sealing oil supply system for a compressor which is capable of preventing an overflow accident by almost 100 percent.

In an overflow-preventing valve of the present invention, a cylindrical portion with an enlarged diameter is formed in a tubular path extending nearly in a vertical direction through a pair of pipe joint portions with flanges, and has upper and lower tapered ends, and a float valve having an inverse U-shaped cross section and ventilating holes and/or notches at a lower portion thereof is loosely fitted in the cylindrical portion with the enlarged diameter.

Further, in the present invention, the float valve is made of a fluorine-type synthetic resin and has a partly spherical portion at the head portion thereof.

Also, in the present invention, a valve seat made of an annular elastic synthetic rubber or an elastic synthetic resin is attached to the upper tapered end of the cylindrical portion with the enlarged diameter.

A sealing oil supply system of the present invention comprises a sealing oil pump, a sealing oil head tank with an oil level controller and a liquid level control valve controlled by the oil level controller, wherein the overflow-preventing valve is installed over the sealing oil head tank, so that sealing oil is positively prevented from leaking as well as the transfer barriers are omitted.

Further, the sealing oil supply system of the present invention is designed for a centrifugal compressor.

DETAILED DESCRIPTION OF THE PREFERRED EMBODIMENTS

The present invention is described in detail by way of embodiments.

Figure 1:
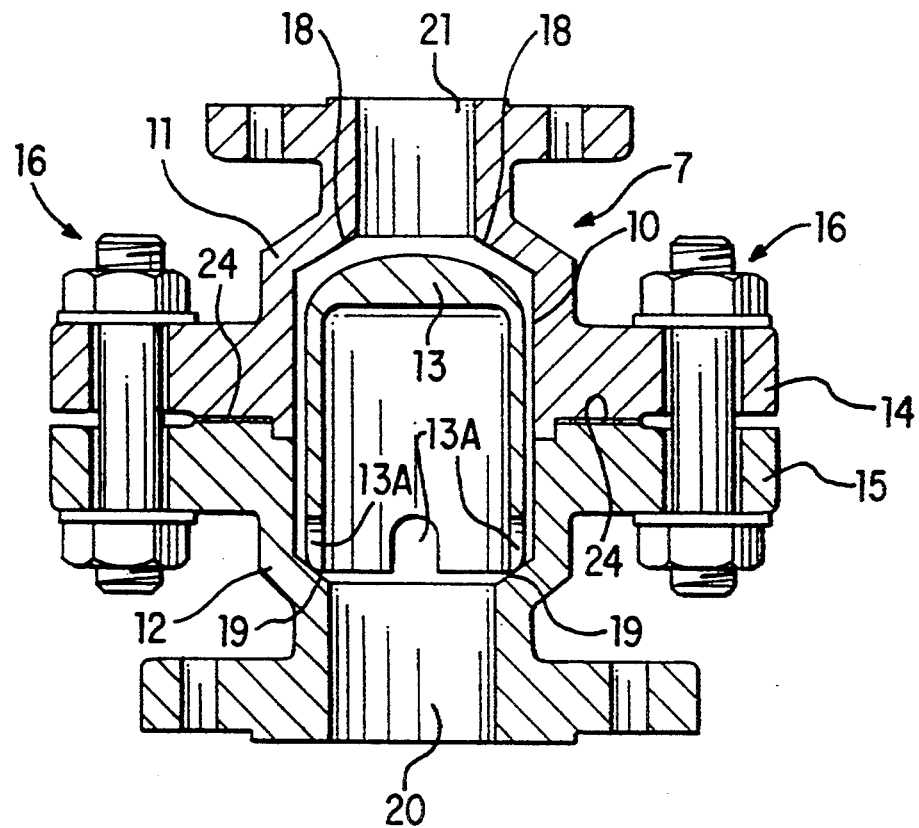
FIG. 1 is a sectional view of an overflow-preventing valve according to a first embodiment of the present invention wherein a liquid level is normal.
Figure 2:
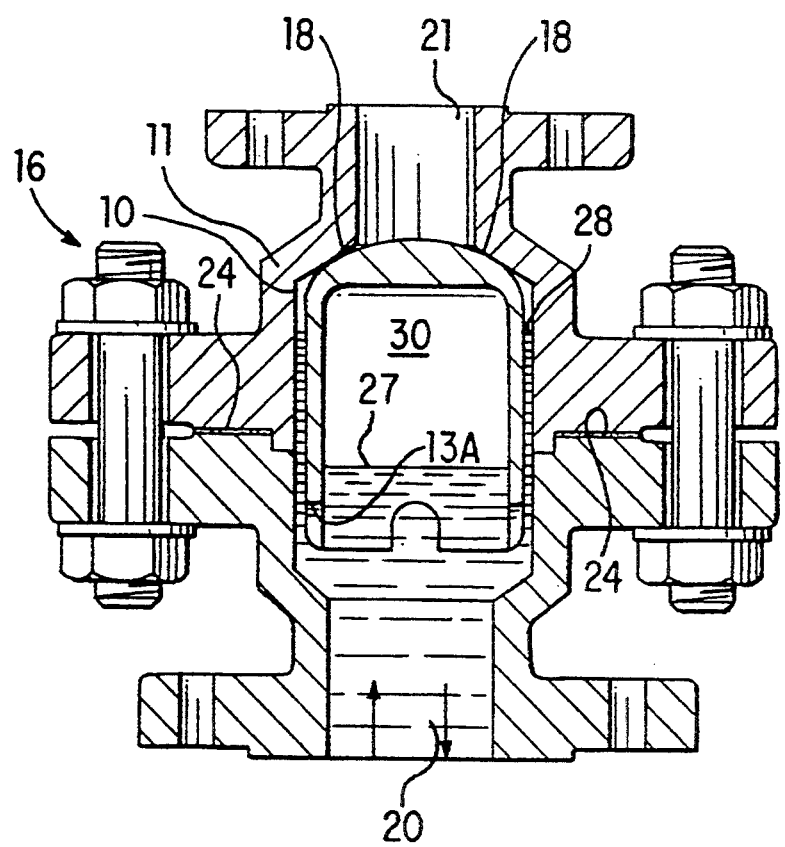
FIG. 2 is a sectional view of the overflow-preventing valve according to the first embodiment of the present invention wherein the liquid level is abnormal.
Figure 3:
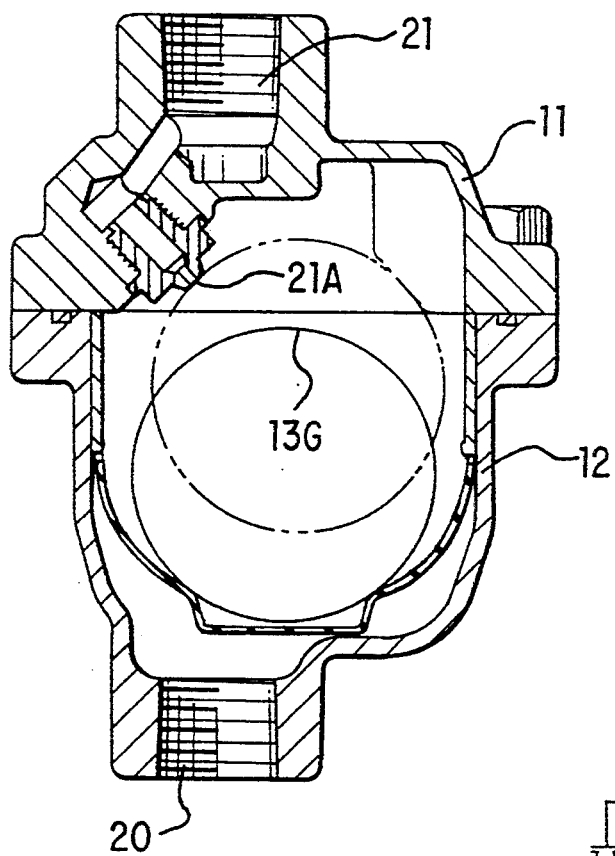
FIG. 3 is a sectional view of a conventional exhaust valve.

In FIGS. 1 and 2, numeral 7 is an overflow-preventing valve according to a first embodiment of this invention, 11 and 12 are an upper valve body and a lower valve body, respectively, 13A are breathing notches, 14 and 15 are junction flanges of the upper and lower valve bodies, 16 are bolts and nuts, 18 is an upper valve seat, 19 is a lower valve seat, 20 is a pipe inlet, 21 is a pipe outlet, and 24 is a gasket.

FIG. 1 is a sectional view of a first embodiment when a liquid level is at a low and normal position, and FIG. 2 is a sectional view of the first embodiment when the liquid level is abnormally raised.

The upper and lower valve bodies 11 and 12 are fastened together through the gasket 24 with a plurality of bolts and nuts 16. A cylindrical portion 10 with an enlarged diameter is formed in the valve bodies, and tapered valve seats 18 and 19 are formed at upper and lower ends thereof, respectively, so that a partly spherical head portion of a float valve 13 is brought into contact with the tapered valve seat 18 when the float valve 13 ascends, and the float valve 13 is positioned approximately at the center of the cylindrical portion 10 when the liquid level is normal and low.

The pipe inlet 20 at a lower end of the valve body may have the same diameter as that of the pipe outlet 21. However, generally, the inlet and outlet have different diameters, and the inlet has a larger diameter, in many cases, than the outlet.

The float valve 13 comprises a cylindrical portion, a partially spherical head portion and an opening on a lower side thereof so as to form an inverse U-shape in a cross section. The float valve 13 is loosely put in the cylinder portion 10 to form spaces in the axial and radial directions. A plurality of breathing notches 13A is formed at a lower end of a skirt of the float valve 13. The breathing notches may be holes or a combination of notches and holes. When a gas pressure in a gas compressor 8 varies under a normal operation condition, the gas flows through the breathing notches 13A and the float valve 13 remains stationary.

When a liquid level rises due to something unusual in the sealing system, the float valve 13 is moved as shown in FIG. 2. That is, a liquid level 27 in the float valve 13 rises while compressing the gas in a gas chamber 30. The float valve 13 then rises when buoyancy of the valve 13 and floating force in the gas chamber 30 exceed a self-weight of the float valve 13. A liquid level 28 outside the float valve 13 is always higher than the liquid level 27 inside the float valve 13. After the float valve 13 contacts the valve seat 18, the gas inside the gas chamber 30 is compressed, so that a difference between the two liquid levels is reduced. With the pressure, the float valve 13 intimately contacts the valve seat 18 at an annular contact surface thereof, thereby to tightly seal therebetween.

In the present embodiment, the float valve 13 is made of a fluorine-containing resin, such as PTFE, PFA, PFEP, PETFE and PCTFE, so that a suitable elasticity, high corrosion and heat resistances can be obtained.

On the other hand, the upper and lower valve bodies 11 and 12 are made of a stainless steel, such as SUS 410 (13Cr-Fe type), to have a hardness greater than that of the float valve. Therefore, when the float valve 13 is pushed against the valve seat 18, the spherical head portion of the float valve 13 is flattened to establish a strong liquid-tight structure, the remaining gas between the cylindrical portion 10 and the float valve 13 is only emitted through the outlet 21, and the liquid is blocked by the annular contact surface. In this case, the valve seat 18 may be provided with a special annular valve seat different from the valve body 11 and made of an elastic synthetic rubber or an elastic synthetic resin, which must be softer than the float valve material.

In the foregoing, it has been explained that the liquid level is raised relatively slowly. However, even when the liquid level is quickly raised due to, for example, an abnormal condition and/or an erroneous operation of the liquid level control valve 2 or the liquid level controller 4, the valve of the invention absorbs energy of the impact by the gas chamber in the float valve 13 and resiliency of the float valve itself as well as the special valve seat, so that chattering takes place very little between the float valve and the valve seat and desired function can be stably obtained. The upper and lower valve bodies may be made of a synthetic resin, such as vinyl chloride, or may be made of a metal which is coated with such a resin.

Figure 4:
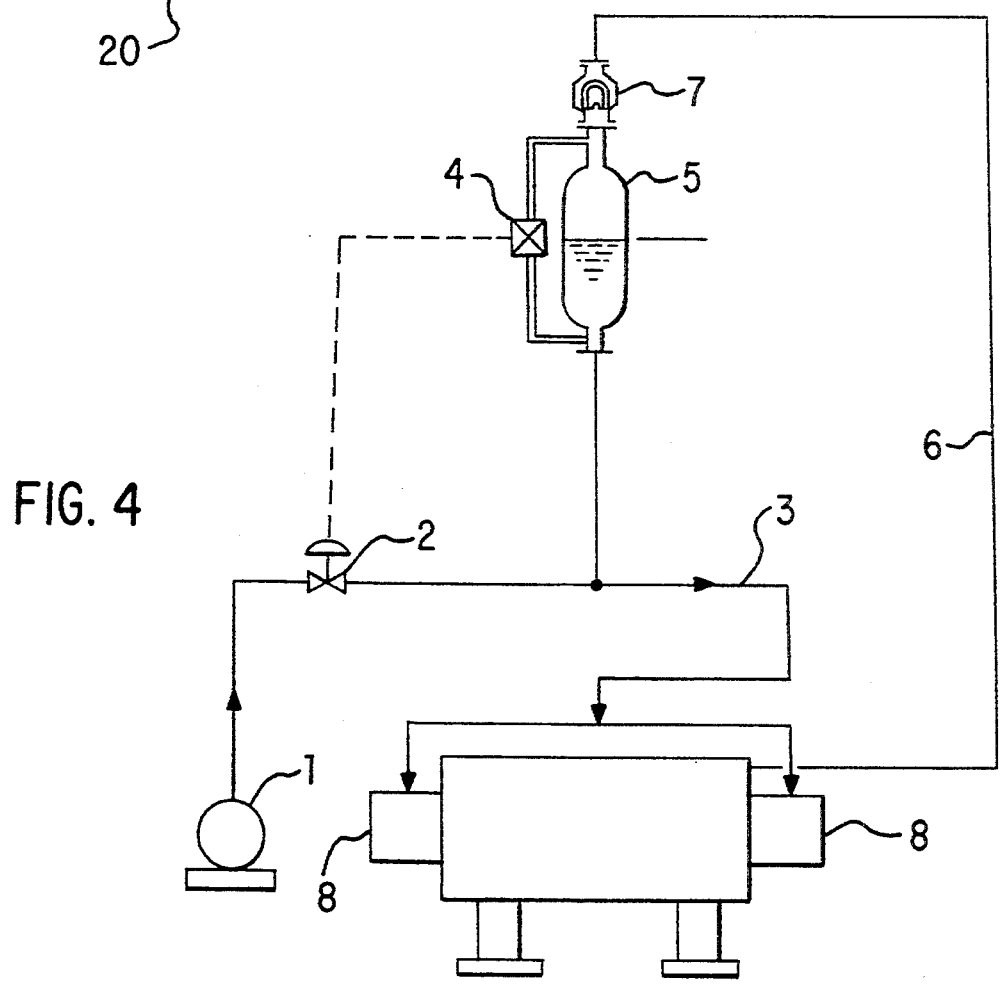
FIG. 4 is an explanatory diagram of a system according to a second embodiment of the present invention.
Figure 5:
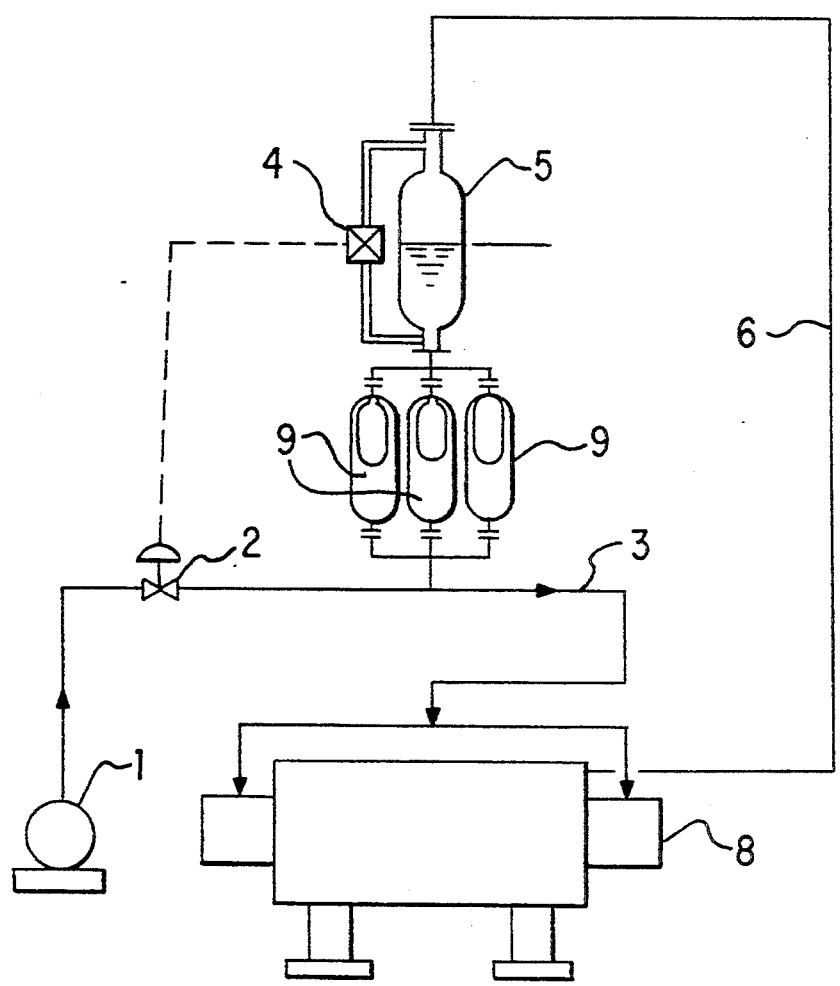
FIG. 5 is an explanatory diagram of a conventional sealing oil supply system.

FIG. 4 is a system diagram illustrating a second embodiment of the invention. A sealing oil supply system of the present invention as shown in FIG. 4 is featured in that transfer barriers 9 shown in FIG. 5 (a system diagram of a prior art) are omitted, and the aforementioned overflow-preventing valve 7 is connected, in series with a pipeline, to an upper outlet of the sealing oil head tank 5.

Since the aforementioned effects can be obtained, the sealing oil is nearly completely prevented from overflowing even without the transfer barriers 9 and cumbersome maintenance is not required for the transfer barriers.

The first and second embodiments of the invention make it possible to accomplish all of the objects mentioned earlier.

More specifically, there is provided a simply constructed and highly reliable overflow-preventing valve which is capable of almost completely preventing the liquid from overflowing even when a liquid level is raised quickly or slowly.

Moreover, a structure of the invention is simple and the valve chamber is easily formed with a high corrosion-resistance so that the valve can be used for a variety of gasses and liquids. Further, the float valve has a small mass and the outlet diameter is made large to allow the valve to respond quickly to a change in the liquid level.

What is claimed is:

1. An overflow-preventing valve comprising:

a first valve body having an outlet portion, a second valve body having an inlet portion, said second valve body being connected to the first valve body so that the inlet and outlet portions are vertically arranged along a common longitudinal axis to communicate together, a chamber formed in at least one of the first and second valve bodies and communicating with the inlet and outlet portions, said chamber having an upper tapered end communicating with the outlet portion, a lower tapered end communicating with the inlet portion, and a diameter greater than the inlet and outlet portions, and a float valve having an inverse U-character shape in a cross section and slidably situated in the chamber, said float valve having a partly spherical head portion, a cylindrical side portion, a bottom opening, a plurality of breathing openings formed at a lower part of the side portion, and a diameter smaller than the diameter of the chamber and greater than the inlet and outlet portions to form a space therebetween so that when the float valve does not float and is in an open position, said float valve is centered on the lower tapered end due to sole centering and aligning operation of the float valve in association with the lower tapered end and allows a gas to flow from the inlet portion to the outlet portion through the breathing openings and the space, and when a liquid enters into the chamber through the inlet portion, the float valve floats to allow the spherical head portion to contact the upper tapered end to thereby prevent the liquid from entering into the outlet portion.

2. An overflow-preventing valve according to claim 1, wherein said first and second valve bodies have flanges to be connected together, and depressions to form the chamber.

3. An overflow-preventing valve according to claim 1, wherein said float valve is made of a fluorine-containing synthetic resin.

4. An overflow-preventing valve according to claim 3, wherein said chamber includes a valve seat made of an annular elastic synthetic rubber and attached to the upper tapered end.

* * * * *